United States Patent [19]
Czopor et al.

[11] 3,798,723
[45] Mar. 26, 1974

[54] CUTTING TOOL

[75] Inventors: Edmund J. Czopor, Bloomfield Hills; Joseph Newton, Livonia; Ralph W. Cochrane, Birmingham; Stan T. Mazur, Detroit, all of Mich.

[73] Assignee: Gorham Tool Company, Detroit, Mich.

[22] Filed: July 27, 1972

[21] Appl. No.: 275,710

[52] U.S. Cl. ............................................. 29/103 A
[51] Int. Cl. ............................................. B26d 1/12
[58] Field of Search ............. 29/95 R, 103 R, 103 A

[56] References Cited
UNITED STATES PATENTS
| | | | |
|---|---|---|---|
| 3,548,476 | 12/1970 | Cave et al. | 29/103 |
| R26,544 | 3/1969 | Castor | 29/103 |
| 3,058,199 | 10/1962 | Cave et al. | 29/103 |

FOREIGN PATENTS OR APPLICATIONS
1,230,614  4/1960  France .................................. 29/103

Primary Examiner—Andrew R. Juhasz
Assistant Examiner—W. R. Briggs
Attorney, Agent, or Firm—Barnes, Kisselle, Raisch & Choate

[57] ABSTRACT

A roughing milling cutter having a plurality of spiral flutes defining the leading edges of the cutting teeth. The cutting teeth are formed as a series of stepped serrations, the circumferentially adjacent stepped serrations defining a helix extending axially around the periphery of the cutter. The helix angle of the serrations is substantially greater than the helix angle of the flutes and each serration defines an axially inclined surface terminating in a shoulder and having both radial and axial clearance.

4 Claims, 9 Drawing Figures

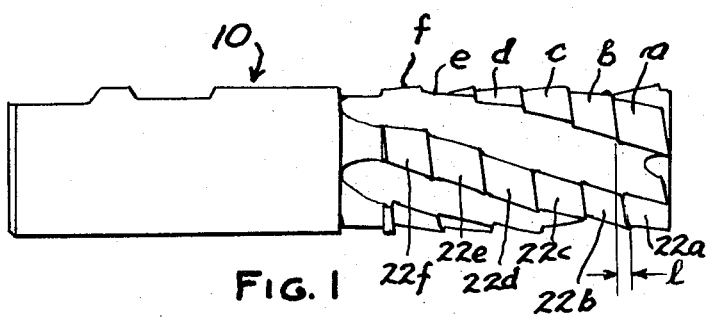
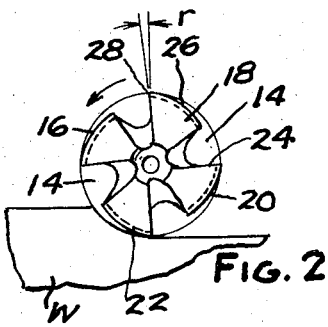
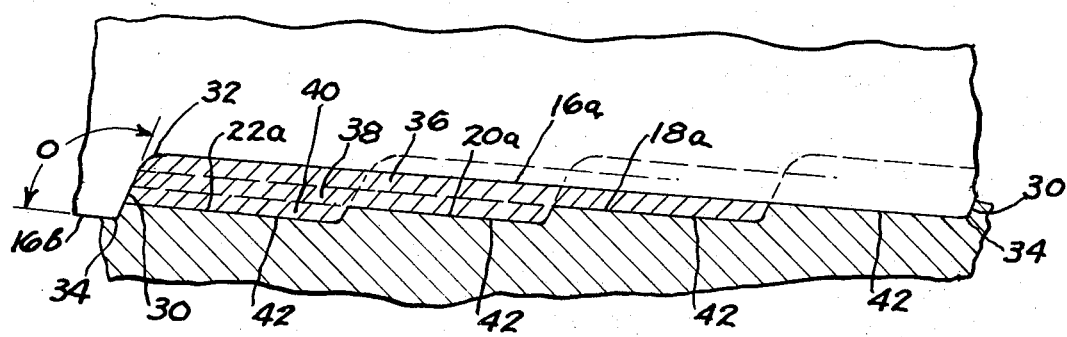
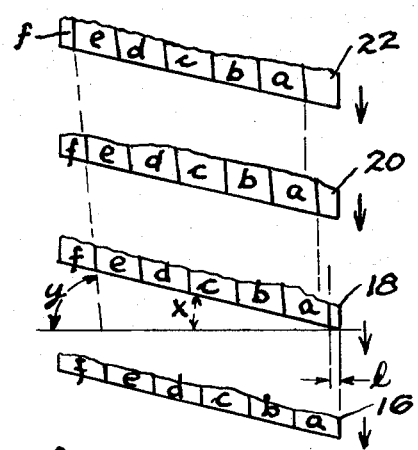
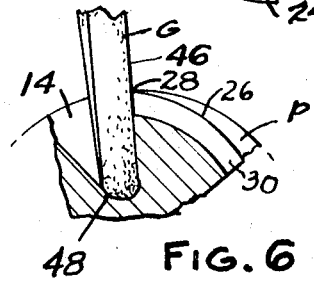

CUTTING TOOL

This invention relates to a cutting tool and, more specifically, to a roughing milling cutter.

It is an object of this invention to provide a milling cutter designed to produce relatively heavy cuts at high speed and high feed rates with minimum power requirements and with minimum vibration, chatter and noise levels.

A further object of the invention resides in a milling cutter adapted to produce relatively small, thick chips by utilizing a plurality of specially formed teeth designed to take heavy loads.

A still further object of the invention is to provide a cutter having a plurality of individual cutting edges which are staggered circumferentially and stepped axially of the cutter to produce a chip-breaking action, each cutting edge being provided with radial and side relief to produce a minimum of drag, side pressure and friction with the work so as to result in an efficient shear-cutting action on the workpiece and, thus, require less horse power to remove a given amount of stock.

Another object of the invention resides in the provision of a milling cutter having a multiplicity of individual form-relieved cutting edges which are easily sharpened by merely grinding the leading face of each cutter tooth by following the helix angle between circumferentially adjacent teeth.

More specifically, the invention contemplates a milling cutter designed primarily for rough heavy cuts and formed with a plurality of helical flutes which define the helically extending teeth on the cutter. Each tooth is formed with a series of axially stepped serrations so that each of the cutting edges has a lengthwise stepped tooth configuration; the circumferentially adjacent stepped teeth are axially staggered and define around the periphery of the cutter a helical form of the same hand as the flutes.

In the drawings:

FIG. 1 is a side elevational view of an end mill;

FIG. 2 is an end view of the cutter illustrating its operation on a workpiece;

FIG. 3 is an enlarged view of one stepped serration and the cutting action of the circumferentially successive stepped serrations during one revolution of the cutter;

FIG. 4 is a diagrammatic view of the cutting edges developed in a flat plane;

FIG. 5 is a fragmentary perspective view showing the junction between two stepped serrations;

FIG. 6 is a sectional view of the cutter showing the manner in which the cutting edges are sharpened;

FIG. 7 illustrates the finish produced by the cutter in relation to the stepped tooth configuration;

Figure 8:
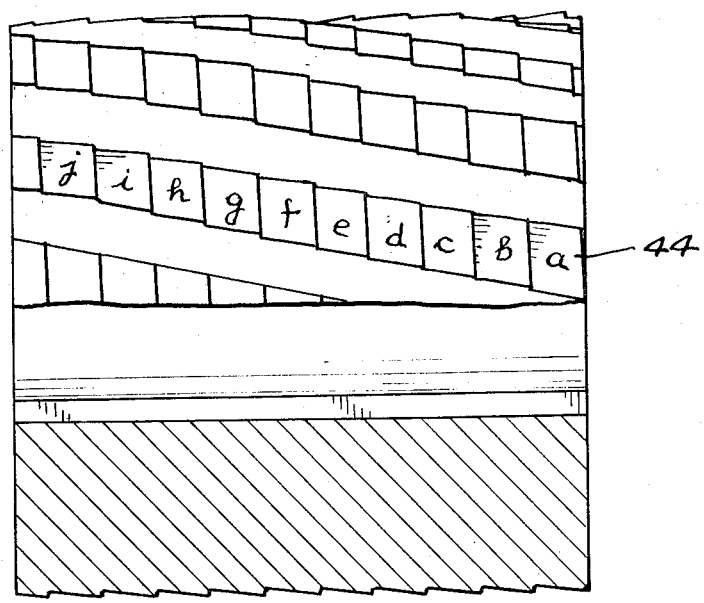
FIG. 8 is a side elevational view, partly in section, of a slab milling cutter embodying the invention and having a larger diameter and a greater number of flutes than the cutter illustrated in FIGS. 1 through 7.

Referring first to the embodiment of the cutter illustrated in FIGS. 1 through 7, it will be observed that the cutter is an end mill having a shank or rear end portion 10 and a forward or cutter portion 12. The cutter portion 12 is formed with four helical flutes 14 which define four helically extending teeth 16, 18, 20 and 22.

The forward face 24 of each tooth intersects the radially outer surface 26 to define a cutting edge 28 on each tooth. Face 24 is ground to provide each cutting edge 28 with a positive front rake angle $r$. Likewise, the peripheral surface 26 of each tooth is radially relieved inwardly in a direction circumferentially rearwardly from the cutting edge 28. The end mill illustrated is of the right-hand type. Thus, as illustrated in FIG. 2, the end mill is rotated in a counterclockwise direction and advances to the left relative to the workpiece W. With such an arrangement and as shown in FIG. 1, flutes 14 are formed with a right-hand helix.

Each tooth is formed with a plurality of stepped serrations $a$, $b$, $c$, $d$, $e$ and $f$. Thus the cutting edges of tooth 16 are designated 16a through 16f and the stepped cutting edges of teeth 18, 20 and 22 are similarly designated $a$ through $f$ with the tooth numeral as the prefix. As shown most clearly in FIGS. 1 and 4, the stepped tooth portions $a$ through $f$ are arranged in helical fashion around the periphery of the cutter. Thus, with a cutter having four teeth each succeeding stepped tooth $a$ is staggered or offset to the left as viewed in FIG. 1 from the next preceding stepped tooth serration by the axial distance $l$ which corresponds to one-quarter of the length of each stepped cutting edge.

Referring to FIG. 3 wherein the stepped serration 16a is shown enlarged, it will be seen that the cutting edge of each stepped serration comprises a straight line which slopes radially inwardly in the axial direction towards shank 10 and is connected with a shoulder 30 by a small radius 32. The peripheral surfaces of each of these stepped serrations are made with a form tool which is advanced to the left as viewed in FIG. 1 at the proper helix angle, the form tool also being fed radially inwardly as it advances axially to provide the peripheral surfaces of each stepped serration with the proper radial relief designated $p$ in FIG. 6. Excellent results have been obtained when the straight cutting edges of each stepped serration are inclined to the axis of the tool at an angle of about 5°–10°, preferably closer to 5°, and the shoulders 30 are inclined to the vertical at an angle of about 30°. The stepped serrations 16a, 18a, 20a and 22a define one complete convolution of the helix around which the stepped serrations are formed and the groups of stepped serrations are so arranged on the cutter that each suceeding convolution forms a continuation of the helix formed by the preceding convolution. Thus, referring to FIG. 4, all of the serrations on the cutter collectively define a helix whose angle (angle $y$ in FIG. 4) relative to the axis of the cutter is substantially greater than the helix angle $x$ of the flutes 14. The crests 34 of each shoulder 30 are all spaced radially from the axis of the tool the same distance. Thus, with the tooth configuration illustrated as the cutter is rotated and advanced into the work a plurality of small, but relatively thick, chips are produced.

For example, considering the successive stepped cutting edges $a$ of the four teeth and considering tooth 16 as the first one to engage the workpiece W, cutting edge 16a will cut a chip which extends the full length of serration 16a, the thickness of the chip will depend upon the speed at which the tool rotates and the rate at which it is fed to the left. However, as the tool rotates, the next successive cutting edge 18a will engage the workpiece and cut a thick chip 36 which is only approximately three-quarters the width of the chip cut by cutting edge 16a. Likewise, the next successive cutting edge 20a will cut a chip 38 which is approximately only one-half the width of the chip cut by edge 16a and the next cutting edge 22a of the first convolution will cut a chip 40 having a width approximately only one-quarter the width of the chip cut by edge 16a. The illustrated showing of FIG. 3 is somewhat diagrammatic since it does not take into account the feed rate of the cutter as it advances into the work. The illustration in FIG. 3 merely represents the cutter rotating about a fixed axis but does illustrate the fact that with the cutter of this invention the chips formed are small and relatively thick as distinguished from a conventional cutter where the chips are long, slender, spiral chips.

Since each of the shoulders 30 follow the helix angle of the stepped serrations and also are radially relieved as shown in FIG. 6, it will be appreciated that the milling cutter of this invention is capable of taking relatively heavy cuts with a minimum of torque and with a relatively heavy chip load per tooth with no heel drag and relatively little side pressure on the teeth. Because of the form of the serrations the side relief on each serration and the radial relief on each serration produces a more nearly perfect shear-cutting effect along the full length of each tooth. The surface produced by the cutter shown in FIG. 4 is illustrated in FIG. 3 (enlarged) and FIG. 7. The workpiece W is formed with a plurality of small ridges 42. The lateral spacing between the ridges, of course, depends upon the number of teeth around the periphery of the cutter in relation to its diameter and the helix angle or lead of the stepped serrations. A smoother cut is obviously produced when the helix angle y of the stepped serrations is increased (lead or pitch decreased with the same diameter cutter) and when the number of teeth on the cutter is increased. It has been found, for example, that when the outer diameter of the cutter is up to about 1 inch a four tooth cutter with a ⅛ inch lead or pitch per convolution performs satisfactorily. As the diameter of the cutter increases the number of teeth should, in accordance with common practice, also increase. Likewise, with an increase in the number of teeth the lead or pitch of each convolution may be increased to obtain good side relief on each serration. Thus, a cutter having an outer diameter of about 1-⅛ inches preferably has six teeth and a 2 inches roughing cutter should have about eight teeth. The helix angle y of the stepped serrations (which determines the pitch or the lead for a particular diameter) can vary considerably depending upon the finish desired on the workpiece. If angle y decreases so that the circumferentially successive serrations on the same diameter cutter with the same number of teeth (a cutter with greater pitch or lead) are spaced apart a greater axial extent, the finish produced will be rougher. However, the pitch or lead should at all events be sufficient to obtain the desired side relief on each successive tooth serration. Thus in the present invention the length of each stepped serration a, b, c, d, e and f is equal to the pitch or lead of each convolution.

Experience has shown that for the purpose of standardizing manufacture milling cutters according to the present invention having a diameter up to about 1-½ inches may have a pitch or lead of one-eighth inch and above 1-½ inches a pitch or lead of about one-fourth inch. Likewise cutters having a diameter up to 1 inch may be formed with four flutes, from 1¼ to 1¾ inches six flutes, and 2 inches diameter eight or more flutes. By maintaining the pitch or lead between one-eighth and one-fourth inch while maintaining the inclination of the serrations between 5° and 10°, it will be appreciated that a very strong tooth design is obtained that is capable of producing heavy cuts at high speeds. The radial depth of each serration is not more than about one-tenth of the axial extent of each serration.

Figure 9:
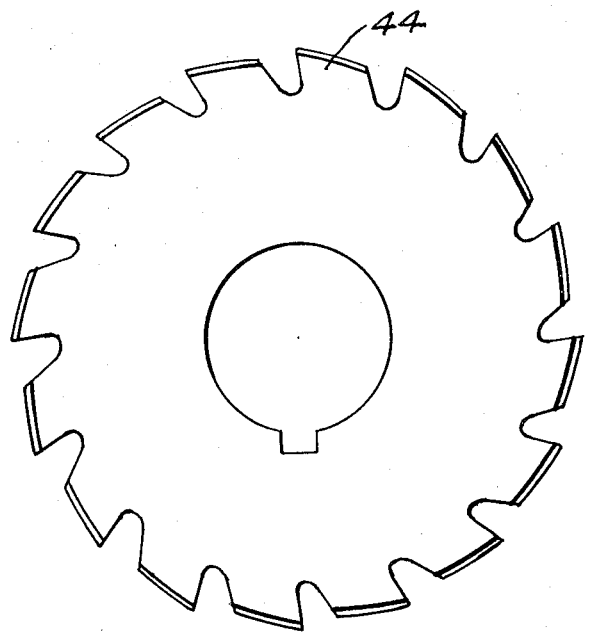
FIG. 9 is an end view of the slab mill shown in FIG. 8.

FIGS. 8 and 9 show a slab mill embodying the invention. In principle the milling cutter shown in FIG. 9 is designed the same as that shown in FIG. 1, except the milling cutter of FIGS. 8 and 9 cannot be fed axially into the work. In this embodiment the cutter is much larger and formed with 16 teeth 44, each of which is formed with the helically arranged stepped serrations a through j. Each of these stepped serrations are shaped with the inclination and with the radial and side relief of the stepped serrations a through f shown in FIG. 1. The helix angle of the stepped serrations of the slab mill shown in FIGS. 8 and 9 is about the same as the helix angle of the stepped serrations shown in FIG. 1. However, since the slab mill shown in FIGS. 8 and 9 represents a cutter having a substantially larger diameter than the cutter shown in FIGS. 1 through 7 and with sixteen teeth instead of four, the pitch or lead per convolution is preferably slightly greater than the cutter shown in FIGS. 1 through 7.

Although it is not essential that the shoulder 30 of each stepped serration be inclined as shown, the inclination of this shoulder at an angle of about 30° to the vertical is preferred since it provides an included angle o (FIG. 3) at the crest 34 of each stepped serration greater than 90°. Thus, the most vulnerable portion of the cutting edge of each stepped serration has considerable strength and resists chipping. However, in spite of the fact that the cutter has a rather intricate contour, the operation of sharpening or resharpening the cutter is relatively simple. For example, as shown in FIG. 6, when it is desired to resharpen a cutter a grinding wheel G is arranged in flute 14 having a flat face 46 and a rounded end 48 which corresponds in contour with the root of the flute 14. The wheel G is set at the proper front rake angle and also set to follow the spiral lead of the flute 14 so that as the wheel advances axially along the flute it simply grinds away the leading face of the tooth and resharpens all of the stepped serrations of each tooth.

We claim:

1. A milling cutter comprising a generally cylindrical body having a plurality of axially extending spiral flutes spaced around its periphery and forming therebetween a plurality of axially extending spiral teeth, each tooth having a spirally extending leading cutting edge defined by the intersection of a front rake face and an outer peripheral curved surface, said outer peripheral surface having a plurality of axially adjacent, circumferentially extending radially stepped serrations therein, each of said serrations comprising an axially extending circumferentially curved surface which is inclined to the axis of the cutter at an angle of about 5°–10° and which terminates in a radially outer crest defined by a radially extending shoulder which is inclined to the axis of the cutter so that the included angle at said crest is at least slightly greater than 100°, said crests at said cutting edges all being equally spaced radially from the axis of the cutter, said outer peripheral faces being radially relieved inwardly from the cutting edge of each tooth to the trailing edge thereof and each of said shoulders being axially relieved from said cutting edge of each tooth to the trailing edge thereof, said serrations imparting to said cutting edge of each tooth a saw tooth configuration wherein the distance between the axially adjacent crests is about at least ten times the radial distance between said crests and the roots of said serrations.

2. A milling cutter as called for in claim 1 wherein each of said shoulders is inclined to the radial plane of the cutter at an angle of about 30°.

3. A milling cutter as called for in claim 1 wherein the axially extending curved surface of each serration is inclined to the axis of the cutter at an angle of about 5°.

4. A milling cutter as called for in claim 3 wherein each of said shoulders is inclined to the radial plane of the cutter at an angle of about 30°.

* * * * *